United States Patent
Padiyath et al.

(10) Patent No.: US 9,244,206 B2
(45) Date of Patent: Jan. 26, 2016

(54) LIGHT REDIRECTING FILM LAMINATE

(75) Inventors: Raghunath Padiyath, Woodbury, MN (US); Charles A. Marttila, Shoreview, MN (US); Mark K. Nestegard, Mendota Heights, MN (US)

(73) Assignee: 3M Innovative Properties Company, St. Paul, MN (US)

(*) Notice: Subject to any disclaimer, the term of this patent is extended or adjusted under 35 U.S.C. 154(b) by 855 days.

(21) Appl. No.: 13/514,429

(22) PCT Filed: Dec. 14, 2010

(86) PCT No.: PCT/US2010/060165
§ 371 (c)(1),
(2), (4) Date: Sep. 17, 2012

(87) PCT Pub. No.: WO2011/084391
PCT Pub. Date: Jul. 14, 2011

(65) Prior Publication Data
US 2012/0327507 A1    Dec. 27, 2012

Related U.S. Application Data

(60) Provisional application No. 61/287,354, filed on Dec. 17, 2009.

(51) Int. Cl.
*G02B 5/20* (2006.01)
*G02B 5/04* (2006.01)
*E06B 9/00* (2006.01)

(52) U.S. Cl.
CPC .. *G02B 5/045* (2013.01); *E06B 9/00* (2013.01)

(58) Field of Classification Search
None
See application file for complete search history.

(56) References Cited

U.S. PATENT DOCUMENTS

| | | | |
|---|---|---|---|
| 721,256 A * | 2/1903 | Wadsworth | F21S 11/00 359/595 |
| 3,841,890 A | 10/1974 | Coaker | |
| 4,144,217 A | 3/1979 | Snelgrove | |
| 4,557,565 A | 12/1985 | Ruck | |
| 4,693,935 A | 9/1987 | Mazurek | |
| 4,989,952 A | 2/1991 | Edmonds | |
| 5,223,465 A | 6/1993 | Ueki | |
| RE34,605 E | 5/1994 | Schrenk | |
| 5,360,659 A | 11/1994 | Arends | |
| 5,579,162 A | 11/1996 | Bjornard | |
| 5,650,875 A * | 7/1997 | Kanada et al. | 359/592 |
| 5,882,774 A | 3/1999 | Jonza | |

(Continued)

FOREIGN PATENT DOCUMENTS

| | | |
|---|---|---|
| CA | 2598729 | 2/2009 |
| EP | 0753121 | 1/1997 |

(Continued)

*Primary Examiner* — Arnel C Lavarias
(74) *Attorney, Agent, or Firm* — Jeffrey M. Olofson

(57) ABSTRACT

Light management film constructions contain a first optical film having a first major surface and a second major surface opposite the first major surface. The first major surface is a microstructured surface with asymmetrical structures. The asymmetrical structures form an ordered arrangement of a plurality of multi-sided refractive prisms, with the multi-sided refractive prisms having a cross section of 3 or greater sides. A second optical film contacts and is bonded to substantially all of the structures of the first major structured surface of the first optical film. The light management constructions can be incorporated into optical articles such as windows.

20 Claims, 2 Drawing Sheets

(56) References Cited

U.S. PATENT DOCUMENTS

| | | | |
|---|---|---|---|
| 6,049,419 A | 4/2000 | Wheatley | |
| 6,322,236 B1 | 11/2001 | Campbell | |
| 6,456,437 B1 | 9/2002 | Lea | |
| 6,616,285 B2 | 9/2003 | Milner | |
| 6,887,917 B2 | 5/2005 | Yang | |
| 7,251,077 B2 * | 7/2007 | Holmes et al. | 359/599 |
| 7,265,800 B2 * | 9/2007 | Jagt et al. | 349/61 |
| 7,452,120 B2 * | 11/2008 | Lee et al. | 362/627 |
| 2006/0154049 A1 | 7/2006 | Padiyath | |
| 2006/0268418 A1 * | 11/2006 | Kim | 359/618 |
| 2008/0043490 A1 | 2/2008 | Coleman | |
| 2008/0081132 A1 | 4/2008 | Bourdelais | |
| 2008/0232135 A1 | 9/2008 | Kinder | |
| 2008/0291541 A1 | 11/2008 | Padiyath | |
| 2009/0091836 A1 * | 4/2009 | Mi et al. | 359/599 |
| 2009/0115943 A1 | 5/2009 | Gaides | |
| 2009/0316269 A1 | 12/2009 | Kim | |
| 2013/0033873 A1 * | 2/2013 | Suzuki et al. | 362/297 |

FOREIGN PATENT DOCUMENTS

| | | |
|---|---|---|
| JP | 2000-268610 | 9/2000 |
| WO | WO 2008/075876 | 6/2008 |
| WO | 2011/084303 | 7/2011 |

* cited by examiner

US 9,244,206 B2

LIGHT REDIRECTING FILM LAMINATE

CROSS REFERENCE TO RELATED APPLICATIONS

This application is a national stage filing under 35 U.S.C. 371 of PCT/US2010/060165, filed Dec. 14, 2010, which claims priority to U.S. Provisional Patent Application No. 61/287,354, filed Dec. 17, 2009, the disclosure of which is incorporated by reference in its/their entirety herein.

FIELD OF THE DISCLOSURE

The present disclosure relates generally to optical films, especially for films that redirect light.

BACKGROUND

A variety of approaches are used to reduce energy consumption in buildings. Among the approaches being considered and applied is the more efficient use of sunlight to provide lighting inside buildings. One technique for supplying light inside of buildings, such as in offices, etc. is the redirection of incoming sunlight. Because sunlight enters windows at a downward angle, much of this light is not useful in illuminating a room. However, if the incoming downward light rays can be redirected upward such that they strike the ceiling, the light can be more usefully employed in lighting the room.

SUMMARY

Techniques and articles for the redirecting of light, such as sunlight, in useful directions are disclosed. Light management film constructions and methods of making them, as well as articles prepared from these constructions are included.

Disclosed herein are light management film constructions comprising a first optical film having a first major surface and a second major surface opposite the first major surface, wherein the first major surface comprises a microstructured surface comprising asymmetrical structures, and a second optical film having a first major surface and a second major surface opposite the first major surface, the second major surface disposed adjacent to and making contact with and bonded to substantially all of the structures of the first major structured surface of the first optical film, and wherein the first major surface of the first optical film and second major surface of the second optical film defines an enclosed volume partially occupied by the structures on the first major surface, such that the structures occupy 20-80% of the total volume defined. The asymmetrical structures comprise an ordered arrangement of a plurality of multi-sided refractive prisms, wherein a cross section of the multi-sided refractive prisms comprise 3 or greater sides.

Also disclosed are methods for preparing light management film constructions comprising preparing a first optical film comprising a first major surface and a second major surface opposite the first major surface, wherein the first major surface comprises a microstructured surface comprising asymmetrical structures, providing a second optical film comprising a first major surface and a second major surface opposite the first major surface, contacting the second major surface of the second optical film to the microstructured surface of the first optical film, and bonding the second major surface of the second optical film to substantially all of the structures of the first major structured surface of the first optical film.

Optical articles are also disclosed which comprise a substrate, and a light management film attached to the substrate, the light management film comprising, a first optical film having a first major surface and a second major surface opposite the first major surface wherein the first major surface comprises a microstructured surface comprising asymmetrical structures, and a second optical film having a first major surface and a second major surface opposite the first major surface, the second major surface disposed adjacent to and making contact with and bonded to substantially all of the structures of the first major structured surface of the first optical film, and wherein the first major surface of the first optical film and second major surface of the second optical film defines an enclosed volume partially occupied by the structures on the first major surface such that the structures occupy 20-80% of the total volume defined.

Also disclosed are methods of redirecting light comprising providing a window, providing a light management film construction comprising a first optical film having a first major surface and a second major surface opposite the first major surface wherein the first major surface comprises a microstructured surface comprising asymmetrical structures, and a second optical film having a first major surface and a second major surface opposite the first major surface, the second major surface disposed adjacent to and making contact with and bonded to substantially all of the structures of the first major structured surface of the first optical film, and wherein the first major surface of the first optical film and second major surface of the second optical film defines an enclosed volume partially occupied by the structures on the first major surface such that the structures occupy 20-80% of the total volume defined, and attaching the light management film construction to the inside surface or outside surface of the window.

DETAILED DESCRIPTION

Figure 1:
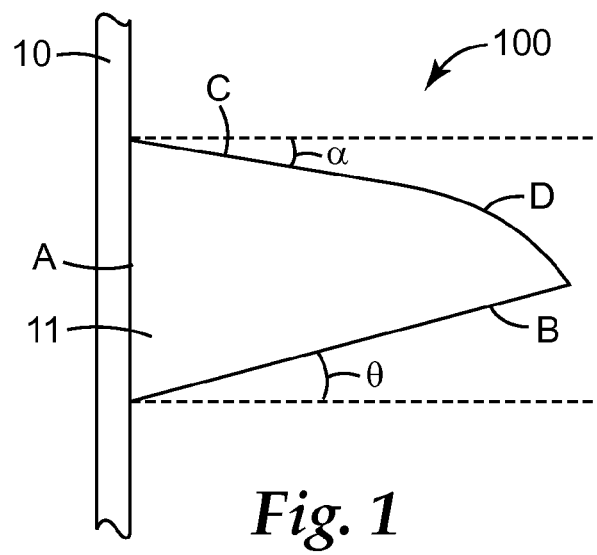
FIG. 1 shows a cross-sectional view of a light redirecting film of this disclosure.

Windows and similar constructions are used to provide natural sunlight to rooms, corridors, and the like, in buildings. However, the angle that natural sunlight falls upon windows is such that typically the light may not penetrate far into the room or corridor. Additionally, since the incoming light may be unpleasantly strong near the window, users sitting near the window may be induced to close shutters, blinds or curtains and thus eliminate this potential source of room illumination. Therefore constructions that can redirect sunlight from the normal incident angle to a direction towards the ceiling of a room or corridor would be desirable.

Since there are many windows for which it would be desirable to effect the redirection of sunlight, it is impractical and impossible to replace all the present windows with ones that redirect light. Therefore, the need remains for light management constructions, such as films, that can be attached to existing substrates, such as windows, and redirect light, especially sunlight, in useful directions, such as towards the ceiling of a room to provide illumination for the room.

In this disclosure, light management film constructions are presented that comprise multilayer laminates that are able to redirect light, especially sunlight, in a desirable direction. The films redirect sunlight from the normal incident direction, which is downward and not very useful for room illumination, to an upwards direction towards the ceiling of the room to provide greater illumination for the room. The films can be applied to substrates, like windows, for example, to provide the light redirection without needing to modify or replace the window itself.

The constructions comprise at least two optical films. The first optical film comprises a first major surface and a second major surface with a microstructured surface on the first major surface. The second optical film comprises a first major surface and a second major surface. The second major surface of the second optical film makes contact with and is bonded to substantially all of the microstructures on the surface of the first film. The first optical film and the second optical film defines an enclosed volume partially occupied by the structures on the first optical film such that the structures occupy 20-80% of the total volume defined.

The term "optical film" as used herein refers to films that are at least optically transparent, may be optically clear and may also produce additional optical effects. Examples of additional optical effects include, for example, light diffusion, light polarization or reflection of certain wavelengths of light.

The term "optically transparent" as used herein refers to films or constructions that appear to be transparent to the naked human eye. The term "optically clear" as used herein refers to film or article that has a high light transmittance over at least a portion of the visible light spectrum (about 400 to about 700 nanometers), and that exhibits low haze. An optically clear material often has a luminous transmission of at least about 90 percent and a haze of less than about 2 percent in the 400 to 700 nm wavelength range. Both the luminous transmission and the haze can be determined using, for example, the method of ASTM-D 1003-95.

The term "ordered arrangement" as used herein to describe a plurality of structures, refers to a regular, repeated pattern of structures.

The terms "point", "side", and "intersection" as used herein, have their typical geometric meanings.

The term "aspect ratio" as used herein when referring to a structure attached to a film, refers to the ratio of the greatest height of the structure above the film to the base of the structure that is attached to, or part of, the film.

The term "adhesive" as used herein refers to polymeric compositions useful to adhere together two adherends. Examples of adhesives are heat activated adhesives, and pressure sensitive adhesives.

Heat activated adhesives are non-tacky at room temperature but become tacky and capable of bonding to a substrate at elevated temperatures. These adhesives usually have a glass transition temperature ($T_g$) or melting point ($T_m$) above room temperature. When the temperature is elevated above the $T_g$ or $T_m$, the storage modulus usually decreases and the adhesive becomes tacky.

Pressure sensitive adhesive compositions are well known to those of ordinary skill in the art to possess at room temperature properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The first optical film may be any suitable film that has high optical transparency in the visible light region of the spectrum. The first optical film may be a single layer film or a multilayer film construction. The first optical film has a first major surface and a second major surface. The first major surface comprises a microstructured surface. This microstructured surface comprises an ordered arrangement of a plurality of asymmetrical multi-sided refractive prisms. It is desirable that the prisms be asymmetrical such that incoming incident solar light (which comes from above and is incident upon the film at an angle of from 15-80° from the direction perpendicular to the film) is redirected upwards towards the ceiling of the room, but incoming light from below is not redirected downwards. An artifact of symmetrical structures is that the downward directed light could be visible to the observer, which is undesirable.

The plurality of asymmetrical multi-sided refractive prisms is designed to effectively redirect incoming solar light towards the ceiling of a room which contains a window or other aperture containing the light directing film. Typically, the asymmetrical multi-sided refractive prisms comprise 3 or greater sides, more typically 4 or greater sides. The prisms may be viewed as an orderly array of protrusions arising from the surface of the optical film. Typically, the aspect ratio of these protrusions is 1 or greater, that is to say that the height of the protrusion is at least as great as the width of the protrusion at the base. In some embodiments, the height of the protrusions is at least 50 micrometers. In some embodiments, the height of the protrusions is no more than 250 micrometers. This means that the asymmetrical structures typically protrude from 50 micrometers to 250 micrometers from the first major surface of the first optical film.

The criteria used to design multi-sided refractive prisms to effect this light redirection is illustrated, for example, in FIG. 1. FIG. 1 shows light directing film 100 which contains film 10 and the cross section of a single prism 11. Prism 11 has 4 sides, side A which is adjacent to film 10, side B which is joined to side A, side C which is joined to side A, and side D which is joined to side B and side C.

Side B is angled in such a way that it produces total internal reflection to solar light rays incident upon the second major surface of the first optical film and passing through side A. Solar light rays are incident from above the second major surface of the first optical film and typically form an angle of from about 15-80° from perpendicular to the first major surface of the first optical film depending upon the time of day, time of year, geographical location of the film, etc. The incident light rays enter the prism 11 and are reflected from side B by the phenomenon of total internal reflection. To achieve total internal reflection, it is desirable that side B not be perpendicular to side A, but be offset from perpendicular by angle θ as shown in FIG. 1. The selection of the value for angle θ will depend upon a variety of variable features including, for example, the refractive index of the composition materials used to prepared the light management film, the proposed geographic location of use for the light management film, etc but typically the value for angle θ is in the range 6-14° or even 6-12°.

Side C is joined to side A and connects side A to side D. It is desirable that side C not be perpendicular to side A, but be offset from perpendicular by angle α. The offset of angle α, among other features, aids in preventing light which exits prism 11 through side D from entering an adjacent prism (not shown in FIG. 1). As with angle θ, the selection of the value for angle α depends upon a variety of variable features, including the closeness of adjacent prisms, the nature and size of side D, etc. Typically, angle α is in the range 5-25° or even 9-25°.

Side D is the side of the prism from which the redirected light rays exit the prism. In FIG. 1 side D is shown as a single side but side D may comprise a series of sides. Also, in FIG. 1 side D is shown as a curved side, but side D need not be curved in all embodiments. Light rays that are reflected from side B are redirected by side D to a direction useful for improving the indirect lighting of a room. By this it is meant that the light rays reflected from side D are redirected either perpendicular to side A or at an angle away from perpendicular and towards the ceiling of the room.

In some embodiments, side C may be curved, side D may be curved, or the combination of sides C and D may form a single continuously curved side. In other embodiments, side C or D or C and D taken together comprises a series of sides, wherein the series of sides comprises a structured surface. The structured surface may be regular or irregular, i.e., the structures may form regular patterns or random patterns and may be uniform or the structures may be different. These structures, since they are substructures on a microstructure, are typically very small. Typically, each dimension of these structures (height, width and length) is smaller than the dimension of side A.

Figure 2:
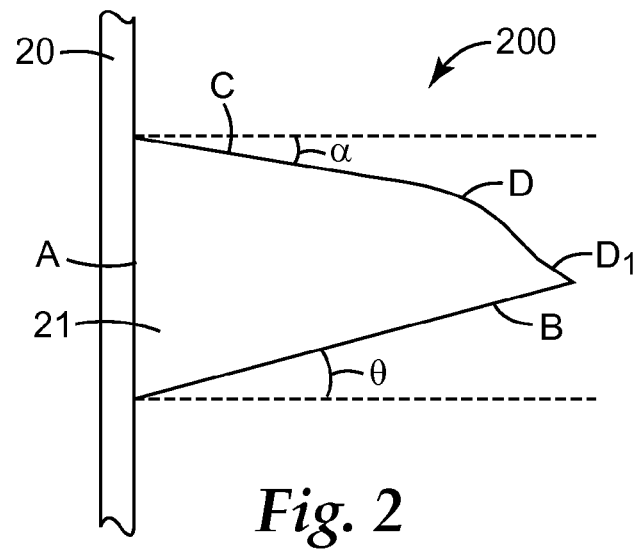
FIG. 2 shows a cross-sectional view of a light redirecting film of this disclosure.

FIG. 2 shows another embodiment of a light directing film. In FIG. 2, light directing film 200 contains film 20 and the cross section of a single prism 21. Prism 21 has 4 sides, side A which is adjacent to film 20, side B which is joined to side A, side C which is joined to side A, and side D which is joined to side B and side C. Side D comprises sub-side D1. Sub-side D1 is joined to side B by a point. This point is where the second optical film of the light management film is joined to film 20 (the second optical film is not shown in FIG. 2). The angles θ and α are as defined in FIG. 1.

Figure 3:
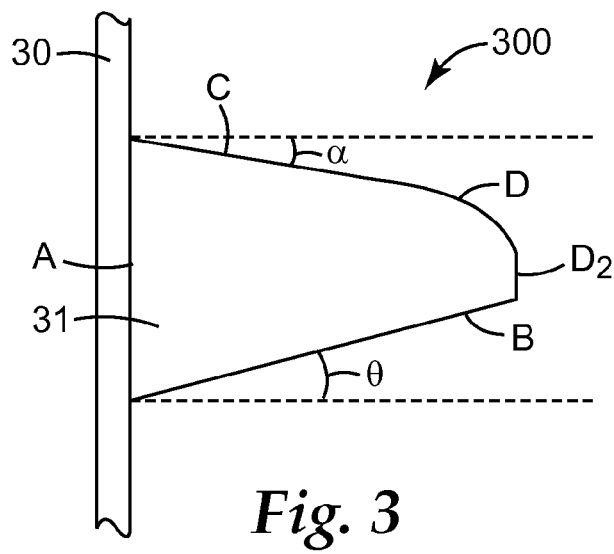
FIG. 3 shows a cross-sectional view of a light redirecting film of this disclosure.

FIG. 3 shows another embodiment of a light directing film. In FIG. 3, light directing film 300 contains film 30 and the cross section of a single prism 31. Prism 31 has 4 sides, side A which is adjacent to film 30, side B which is joined to side A, side C which is joined to side A, and side D which is joined to side B and side C. Side D comprises sub-side D2. Sub-side D2 is joined to side B and is designed to form a bonding zone where the second optical film of the light management film can be joined to film 30 (the second optical film is not shown in FIG. 3). The angles θ and α are as defined in FIG. 1.

The entire surface of the optical substrate may contain microstructures, or the microstructures may be present on only a portion of the first surface of the first optical film. Since the film construction may be attached to a large glazing article, such as, for example, a window, it may not be necessary or desirable for the entire surface of the glazing article to contain a microstructured surface in order to produce the desirable light redirection effect. It may be desirable for only a portion of the glazing article to contain the light redirection film construction, or alternatively, if the entire glazing article surface is covered by a film construction, it may be desirable that only a portion of the film construction contain the light redirecting microstructures.

Figure 4:
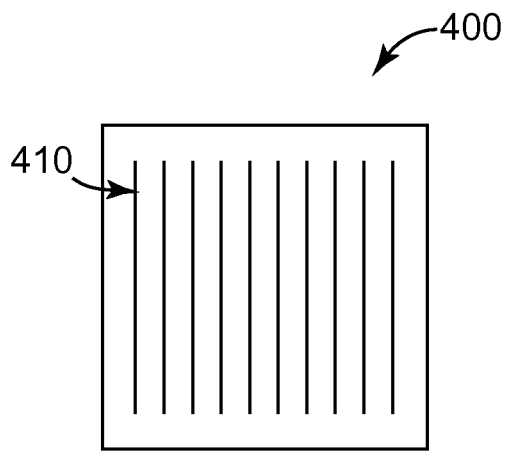
FIG. 4 shows a top view of a light redirecting film of this disclosure.
Figure 5:
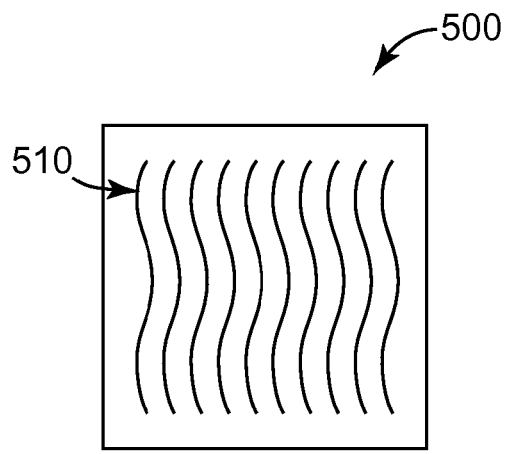
FIG. 5 shows a top view of a light redirecting film of this disclosure.
Figure 6:
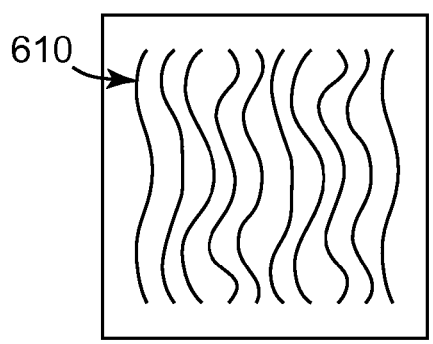
FIG. 6 shows a top view of a light redirecting film of this disclosure.
Figure 7:
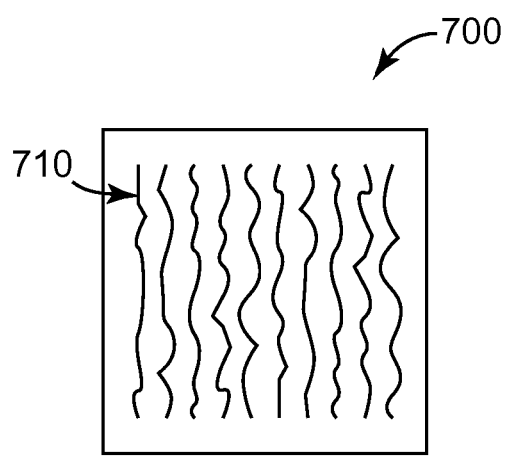
FIG. 7 shows a top view of a light redirecting film of this disclosure.

The ordered arrangement of a plurality of asymmetrical multi-sided refractive prisms can form an array of microstructures. The array can have a variety of elements. For example, the array can be linear (i.e. a series of parallel lines), sinusoidal (i.e. a series of wavy lines), random, or combinations thereof. While a wide variety of arrays are possible, it is desirable that the array elements are discrete, i.e., that the array elements do not intersect or overlap. FIGS. 4-7 show top views of ordered arrangements of a plurality of asymmetrical multi-sided refractive prisms with a variety of array elements. In FIG. 4, light redirecting construction 400 contains linear array elements 410. In FIG. 5, light redirecting construction 500 contains sinusoidal array elements 510. In FIG. 6, light redirecting construction 600 contains sinusoidal array elements 610. In FIG. 6, the sinusoidal array elements 610 are out of phase with one another. In FIG. 7, light redirecting construction 700 contains random array elements 710. The array elements in FIGS. 4-7 are merely representational and are not drawn to scale, also, the figures are intended to be illustrative, additional array elements and combinations are possible and are within the scope of this disclosure.

The second major surface of the first optical film is designed to be laminated to a first glazing substrate. Typically, this surface contains a coating, such as an adhesive coating, which adheres the light redirecting film to a first glazing substrate surface. Examples of suitable adhesives include, for example, heat activated adhesives, pressure sensitive adhesives or curable adhesives. Examples of suitable optically clear curable adhesives include those described in U.S. Pat. No. 6,887,917 (Yang et al.). Depending upon the nature of the adhesive, the adhesive coating may have a release liner attached to it to protect the adhesive coating from premature adhesion to surfaces and from dirt and other debris which can adhere to the adhesive surface. The release liner typically remains in place until the light redirecting laminate is to be attached to the substrate. Typically, a pressure sensitive adhesive is used.

A wide variety of pressure sensitive adhesive compositions are suitable. In some embodiments, the pressure sensitive adhesive is optically clear. The pressure sensitive adhesive component can be any material that has pressure sensitive adhesive properties. Additionally, the pressure sensitive adhesive component can be a single pressure sensitive adhesive or the pressure sensitive adhesive can be a combination of two or more pressure sensitive adhesives.

Suitable pressure sensitive adhesives include, for example, those based on natural rubbers, synthetic rubbers, styrene block copolymers, polyvinyl ethers, poly(meth)acrylates (including both acrylates and methacrylates), polyolefins, silicones, or polyvinyl butyral.

The optically clear pressure sensitive adhesives may be (meth)acrylate-based pressure sensitive adhesives. Useful alkyl (meth)acrylates (i.e., acrylic acid alkyl ester monomers) include linear or branched monofunctional unsaturated acrylates or methacrylates of non-tertiary alkyl alcohols, the alkyl groups of which have from 4 to 14 and, in particular, from 4 to 12 carbon atoms. Poly(meth)acrylic pressure sensitive adhesives are derived from, for example, at least one alkyl (meth)acrylate ester monomer such as, for example, isooctyl acrylate, isononyl acrylate, 2-methyl-butyl acrylate, 2-ethyl-n-hexyl acrylate and n-butyl acrylate, isobutyl acrylate, hexyl acrylate, n-octyl acrylate, n-octyl methacrylate, n-nonyl acrylate, isoamyl acrylate, n-decyl acrylate, isodecyl acrylate, isodecyl methacrylate, isobornyl acrylate, 4-methyl-2-pentyl acrylate and dodecyl acrylate; and at least one optional co-monomer component such as, for example, (meth)acrylic acid, vinyl acetate, N-vinyl pyrrolidone, (meth)acrylamide, a vinyl ester, a fumarate, a styrene macromer, alkyl maleates and alkyl fumarates (based, respectively, on maleic and fumaric acid), or combinations thereof.

In certain embodiments, the poly(meth)acrylic pressure sensitive adhesive is derived from between about 0 and about 20 weight percent of acrylic acid and between about 100 and about 80 weight percent of at least one of isooctyl acrylate, 2-ethyl-hexyl acrylate or n-butyl acrylate composition.

In some embodiments, the adhesive layer is at least partially formed of polyvinyl butyral. The polyvinyl butyral layer may be formed via known aqueous or solvent-based acetalization process in which polyvinyl alcohol is reacted with butyraldehyde in the presence of an acidic catalyst. In some instances, the polyvinyl butyral layer may include or be formed from polyvinyl butyral that is commercially available from Solutia Incorporated, of St. Louis, Mo., under the trade name "BUTVAR" resin.

In some instances, the polyvinyl butyral layer may be produced by mixing resin and (optionally) plasticizer and extruding the mixed formulation through a sheet die. If a plasticizer is included, the polyvinyl butyral resin may include about 20 to 80 or perhaps about 25 to 60 parts of plasticizer per hundred parts of resin. Examples of suitable plasticizers include esters of a polybasic acid or a polyhydric alcohol. Suitable plasticizers are triethylene glycol bis(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyl adipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217.

The adhesive layer may be crosslinked. The adhesives can be crosslinked by heat, moisture or radiation, forming covalently crosslinked networks which modify the adhesive's flowing capabilities. Crosslinking agents can be added to all types of adhesive formulations but, depending on the coating and processing conditions, curing can be activated by thermal or radiation energy, or by moisture. In cases in which crosslinker addition is undesirable one can crosslink the adhesive if desired by exposure to an electron beam.

The degree of crosslinking can be controlled to meet specific performance requirements. The adhesive can optionally further comprise one or more additives. Depending on the method of polymerization, the coating method, the end use, etc., additives selected from the group consisting of initiators, fillers, plasticizers, tackifiers, chain transfer agents, fibrous reinforcing agents, woven and non-woven fabrics, foaming agents, antioxidants, stabilizers, fire retardants, viscosity enhancing agents, and mixtures thereof can be used.

In addition to being optically clear, the pressure sensitive adhesive may have additional features that make it suitable for lamination to large substrates such as windows. Among these additional features is temporary removability. Temporarily removable adhesives are those with relatively low initial adhesion, permitting temporary removability from, and repositionability on, a substrate, with a building of adhesion over time to form a sufficiently strong bond. Examples of temporarily removable adhesives are described, for example in U.S. Pat. No. 4,693,935 (Mazurek). Alternatively, or in addition, to being temporarily removable, the pressure sensitive adhesive layer may contain a microstructured surface. This microstructured surface permits air egress as the adhesive is laminated to a substrate. For optical applications, typically, the adhesive will wet out the surface of the substrate and flow to a sufficient extent that the microstructures disappear over time and therefore do not affect the optical properties of the adhesive layer. A microstructured adhesive surface may be obtained by contacting the adhesive surface to a microstructuring tool, such as a release liner with a microstructured surface.

The pressure sensitive adhesive may be inherently tacky. If desired, tackifiers may be added to a base material to form the pressure sensitive adhesive. Useful tackifiers include, for example, rosin ester resins, aromatic hydrocarbon resins, aliphatic hydrocarbon resins, and terpene resins. Other materials can be added for special purposes, including, for example, oils, plasticizers, antioxidants, ultraviolet ("UV") stabilizers, hydrogenated butyl rubber, pigments, curing agents, polymer additives, thickening agents, chain transfer agents and other additives provided that they do not reduce the optical clarity of the pressure sensitive adhesive. In some embodiments, the pressure sensitive adhesive may contain a UV absorber (UVA) or hindered amine light stabilizer (HALS). Suitable UVAs include, for example, benzotriazole UVAs such as the compounds available from Ciba, Tarrytown, N.Y. as TINUVIN P, 213, 234, 326, 327, 328, 405 and 571. Suitable HALS include compounds available from Ciba, Tarrytown, N.Y. as TINUVIN 123, 144, and 292.

The pressure sensitive adhesive of the present disclosure exhibits desirable optical properties, such as, for example, controlled luminous transmission and haze. In some embodiments, substrates coated with the pressure sensitive adhesive may have substantially the same luminous transmission as the substrate alone.

Besides being the carrier and support layer for the microstructured surface, the optical film can also provide additional functionality to the light redirecting film. For example, the optical film can be a multilayer film that can reflect infrared light. In this way the light redirecting laminate can also help to keep the undesirable infrared light (heat) out of the building while allowing the desirable visible light into the building. Examples of suitable multilayer films useful as the first optical film include those disclosed, for example, in U.S. Pat. Nos. 6,049,419, 5,223,465, 5,882,774, 6,049,419, RE 34,605, 5,579,162 and 5,360,659. In some embodiments, the first optical film is a multilayer film in which the alternating polymeric layers cooperate to reflect infrared light. In some embodiments, at least one of the polymeric layers is a birefringent polymer layer.

The first optical film may have additional coatings on the second major surface in addition to or instead of the adhesive coating already described. For example, the second major surface may contain an anti-glare coating.

Typically, the first optical film or first multilayer optical film, is prepared from polymeric materials that permit the film to be optically clear. Examples of suitable polymeric materials include, for example, polyolefins such as polyethylene and polypropylene, polyvinyl chloride, polyesters such as polyethylene terephthalate, polyamides, polyurethanes, cellulose acetate, ethyl cellulose, polyacrylates, polycarbonates, silicones, and combinations or blends thereof. The optical film may contain other components besides the polymeric material, such as fillers, stabilizers, antioxidants, plasticizers and the like. In some embodiments, the optical film may comprise a stabilizer such as a UV absorber (UVA) or hindered amine light stabilizer (HALS). Suitable UVAs include, for example, benzotriazole UVAs such as the compounds available from Ciba, Tarrytown, N.Y. as TINUVIN P, 213, 234, 326, 327, 328, 405 and 571. Suitable HALS include compounds available from Ciba, Tarrytown, N.Y. as TINUVIN 123, 144, and 292.

The microstructure layer on the first major surface of the first optical film may be formed in a variety of ways. Typically, the microstructure layer comprises a thermoplastic or a thermoset material.

The microstructured films described above are manufactured using various methods, including embossing, extrusion, casting and curing, compression molding and injection molding. One method of embossing is described in U.S. Pat. No. 6,322,236, which includes diamond turning techniques to form a patterned roll which is then used for embossing a microstructured surface onto a film. A similar method may be used to form the films described above having an ordered arrangement of a plurality of asymmetrical structures.

Other approaches may be followed for producing a film having a microstructured surface with a repeating pattern. For example, the film may be injection molded using a mold having a particular pattern thereon. The resulting injection molded film has a surface that is the complement of the pattern in the mold. In another and similar approach, the film may be compression molded.

In some embodiments, the structured films are prepared using an approach called casting and curing. In casting and curing, a curable mixture is coated onto a surface to which a microstructuring tool is applied or the mixture is coated into a microstructuring tool and the coated microstructuring tool is contacted to a surface. The curable mixture is then cured and the tooling is removed to provide a microstructured surface. Examples of suitable microstructuring tools include microstructured molds and microstructured liners. Examples of suitable curable mixtures include thermoset materials such as the curable materials used to prepare polyurethanes, polyepoxides, polyacrylates, silicones, and the like.

The laminate construction also comprises a second optical film, the second optical film having a first major surface and a second major surface. The second major surface of the second optical film makes contact with and is bonded to substantially all of the microstructures on the surface of the first optical film. The second optical film, together with the first optical film, define an enclosed volume partially occupied by the structures on the first optical film, such that the structures occupy 20-80% of the total volume defined. The surface of the first optical film used to define this volume is the plane of the first major surface of first optical film. This plane is the surface of the first optical film from which the structures protrude.

The second optical film may be the made of the same material or materials as the first optical film, or it may be different. The second optical film protects the microstructured surface and prevents the structures from becoming damaged, dirty or otherwise rendered incapable of redirecting light.

The second major surface of the second optical film contacts the tops of the asymmetrical multi-sided refractive prisms of the microstructured surface of the first optical film. At the areas of contact between the second optical film and the tops of the asymmetrical multi-sided refractive prisms, these elements are bonded. This bonding may take a variety of forms useful for laminating together 2 polymeric units, including adhesive bonding, heat lamination, ultrasonic welding and the like. For example, the second optical film could be heated to soften the film and the film contacted to the microstructured surface of the first optical film. The heated film, upon cooling, forms bonds to the contacted portions of the microstructured layer of the first optical film. Similarly, the second optical film could be dry laminated to the microstructured surface of the first optical film and then heat, either directly or indirectly, could be applied to produce the laminated article. Alternatively, an ultrasonic welder could be applied to the dry laminate construction. Typically, adhesive bonding is used. When adhesive bonding is used, either a heat activated adhesive or a pressure sensitive adhesive can be used. Generally, pressure sensitive adhesive are used, especially the optically clear pressure sensitive adhesives described above.

To effect the adhesive bonding, the adhesive may be applied either to the microstructured surface of the first optical film, or to the second major surface of the second optical film. Typically, the adhesive is applied to the second major surface of the second optical film. The applied adhesive coating may be continuous or discontinuous. The adhesive coating may be applied through any of a variety of coating techniques including knife coating, roll coating, gravure coating, rod coating, curtain coating, air knife coating, or a printing technique such as screen printing or inkjet printing. The adhesive may be applied as a solvent-based (i.e. solution, dispersion, suspension) or 100% solids composition. If solvent-based adhesive compositions are used, typically, the coating is dried prior to lamination by air drying or at elevated temperatures using, for example, an oven such as a forced air oven. The adhesive coated second optical film can then be laminated to the microstructured surface of the first optical film. The lamination process should be well controlled to provide uniform and even contact on the tips of the microstructured prisms described above.

Besides being the protective layer for the microstructured surface, the second optical film can also provide additional functionality to the light redirecting laminate. For example, the second optical film can be a multilayer film that can reflect infrared light. In this way the light redirecting laminate can also help to keep the undesirable infrared light (heat) out of the building while allowing the desirable visible light into the building. Examples of suitable multilayer films useful as the second optical film, include those disclosed, for example, in U.S. Pat. Nos. 6,049,419, 5,223,465, 5,882,774, 6,049,419, RE 34,605, 5,579,162 and 5,360,659. In some embodiments, the first optical film is a multilayer film in which the alternating polymeric layers cooperate to reflect infrared light. In some embodiments, at least one of the polymeric layers is a birefringent polymer layer.

Since the first major surface of the second optical film is generally exposed to the inside of the room, it may be desirable to have additional coatings on the first major surface. For example, the first major surface may contain a protective coating such as a hardcoat to prevent the surface from scratches and marks as well as to protect the surface from damage from surface cleaners, or to make the surface graffiti-resistant or easier to clean. Examples of suitable coatings include, for example, hardcoats, anti-scratch coatings, low surface energy coatings or easy clean coatings.

Typically, the second optical film or second multilayer optical film, is prepared from polymeric materials that permit the film to be optically clear. Examples of suitable polymeric materials include, for example, polyolefins such as polyethylene and polypropylene, polyvinyl chloride, polyesters such as polyethylene terephthalate, polyamides, polyurethanes, cellulose acetate, ethyl cellulose, polyacrylates, polycarbonates, silicones, and combinations or blends thereof. The optical film may contain other components besides the polymeric material, such as fillers, stabilizers, antioxidants, plasticizers and the like. In some embodiments, the optical film may comprise a stabilizer such as a UV absorber (UVA). Suitable UVAs include, for example, benzotriazole UVAs such as the compounds available from Ciba, Tarrytown, N.Y. as TINUVIN P, 213, 234, 326, 327, 328, 405 and 571.

The light management film constructions of this disclosure are designed to redirect incoming sunlight to make the sunlight more useful for room lighting. The film constructions redirect the generally downward angled light from the sun towards the ceiling of a room to aid in the overall illumination of the room. Measurements of the ability of the film constructions to redirect light can be determined by laboratory testing, precluding the need to test the constructions by installing them into windows for testing. An example of such a test involves the shining of a beam of light with a controlled intensity onto the film construction and measuring the amount of light that is redirected upwards. The input beam of light may be set at a given angle or may be varied over a range of angles. The amount of light redirected upwards can be measured, for example, with a photodetector. It may be desirable to measure the distribution of light at all directions. This type of measurement is commonly referred to as bi-directional transmission distribution function (BTDF). An instrument available from Radiant Imaging, WA, under trade name IMAGING SPHERE may be used to perform such measurements.

The light management film constructions of this disclosure may be attached to substrates to provide articles, such as light directing articles. The substrates are at least optically transparent, and may be optically clear. Examples or suitable substrates include, for example, windows. Windows may be made of a variety or different types of glazing substrates such as a variety of glasses or from polymeric materials such as polycarbonate or polymethyl methacrylate. In some embodiments, the window may also comprise additional layers or treatments. Examples of additional layers include, for example, additional layers of film designed to provide glare reduction, tinting, shatter resistance and the like. Examples of additional treatments that may be present of windows include, for example, coatings or various types such as hardcoats, and etchings such as decorative etchings.

Typically, the light management film constructions contain an adhesive layer which may be protected by a release liner on the second major surface of the first optical film. As mentioned above, the release liner may contain a microstructured surface to impart microstructuring to the adhesive surface and permit air egress as the light management film is laminated to the substrate. This air egress aids in the elimination of air bubbles in the lamination.

As mentioned above, the adhesive may also be removable, meaning adhesives with relatively low initial adhesion, permitting temporary removability from and repositionability on a substrate, with a building of adhesion over time to form a sufficiently strong bond. This can particularly useful when large areas of a substrate are to be laminated.

Historically, the lamination of an article, such as light management film, to a large surface substrate has been accomplished by what is sometimes called a "wet" application process. The wet application process involves spraying a liquid, typically a water/surfactant solution, onto the adhesive side of the large format article, and optionally onto the substrate surface. The liquid temporarily "detackifies" the pressure sensitive adhesive so the installer may handle, slide, and re-position the large format article into a desired position on the substrate surface. The liquid also allows the installer to pull the large format article apart if it sticks to itself or prematurely adheres to the surface of the substrate. Applying a liquid to the adhesive may also improve the appearance of the installed large format article by providing a smooth, bubble free appearance with good adhesion build on the surface of the substrate.

While the wet application process has been used successfully in many instances, it is a time consuming and messy process. A "dry" application process is generally desirable for installing large format graphic articles. Adhesives that are self wetting and removable may be applied with a dry installation process. The articles are easily attached to a large substrate because they are self wetting and yet they may be easily removed and repositioned as needed.

The light management film constructions of this disclosure may be attached to either exposed surface of a substrate such as a window. By exposed surfaces of a window, it is meant that the inside exposed surface is the surface of the window that faces into the room and the outside exposed surface is the surface of the window that faces the external environment. Typically, for ease of installation, the light management film construction is attached to inside exposed surface of a window.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Example 1

A master tool having the negative of the desired linear grooves and prismatic elements (with a cross section similar to FIG. 3) was obtained using a diamond turning process. A UV curable resin composition was prepared by blending 74 parts by weight of an aliphatic urethane acrylate oligomor, commercially available under the trade designation "PHOTOMER 6010" from Cognis, Monheim, Germany, 25 parts 1,6-hexanediol diacrylate, commercially available under the trade designation "SARTOMER SR 238" from Sartomer, Exton, Pa., and an alpha-hydroxy ketone UV photoinitiator (2-hydroxy-2-methyl-1-phenyl-1-propanone), commercially available under the trade designation "DAROCUR 1173" from Ciba, Basel, Switzerland. A 76 micrometer (3 mil) thick PET (polyethylene terephthalate) film, commercially available from DuPont Teijin Films, Hopewell, Va. under the trade designation "MELINEX 453", was coated with the UV curable resin to an approximate thickness of 85 micrometers. The coated film was placed in physical communication with the master tool such that the grooves were void of any air. The resin was cured while in physical communication with the master tool with a microwave powered UV curing system available from Fusion UV systems, Gaithersburg, Md. The cured resin on the web was removed from the master tool resulting in a microstructured film. One liner of a 25 micrometer (1 mil) thick optically clear adhesive transfer tape, commercially available from 3M Company, St. Paul, Minn. under the trade designation "3M OPTICALLY CLEAR ADHESIVE 8171", was removed and the exposed adhesive surface was laminated to the non-structured side of the microstrutured film in a roll-to-roll laminator available from Protech Engineering, Wilmington, Del. A multilayer film article as disclosed on pages 5-6 of US Patent Publication No. 2006/0154049 was laminated to the structured side of the microstructured film to produce the final light redirecting film laminate.

What is claimed is:

1. A light management film construction comprising:
    a first optical film having a first major surface and a second major surface opposite the first major surface wherein the first major surface comprises a microstructured surface comprising asymmetrical structures; and
    a second optical film having a first major surface and a second major surface opposite the first major surface, the second major surface disposed adjacent to and making contact with and bonded to substantially all of the structures of the first major structured surface of the first optical film, and wherein the first major surface of the first optical film and second major surface of the second optical film defines an enclosed volume partially occupied by the structures on the first major surface of the first optical film such that the structures occupy 20-80% of the total volume defined.

2. The light management film construction of claim 1, wherein the asymmetrical structures comprise an ordered arrangement of a plurality of multi-sided refractive prisms, wherein a cross section of each of the multi-sided refractive prisms comprises 3 or greater sides.

3. The light management film construction of claim 2 wherein each of the multi-sided refractive prisms comprises 4 sides A, B, C, and D such that: side A of the multi-sided refractive prism is parallel to and adjacent to the first major surface of the first optical film; side B of the multi-sided refractive prism is joined to side A and is designed to produce total internal reflection of light rays incident upon the second major surface of the first optical film at an angle of from 15-80° above the horizontal of normal to side A; side C of the multi-sided refractive prism is joined to side A; and side D of the multi-sided refractive prism is connected to side C and side B, and is designed to substantially redirect light rays reflected from side B in a direction away from side B and towards the side C or D.

4. The light management film construction of claim 3, wherein side B forms an angle with side A which is less than 90° at the point of intersection.

5. The light management film construction of claim 3, wherein side C forms an angle with side A of less than or equal to 90° at the point of intersection.

6. The light management film construction of claim 3, wherein side D comprises a series of sides, at least one of which is curved, or side C and D together form a single curved surface.

7. The light management film construction of claim 6, wherein side D comprises a side $D_2$ which provides a bonding surface for the second major surface of the second optical film.

8. The light management film construction of claim 3, wherein side C or D or C and D taken together comprises a series of sides, wherein the series of sides comprises a structured surface, wherein each dimension of a structure on the structured surface is smaller than side A.

9. The light management film construction of claim 1, wherein the asymmetrical structures have an aspect ratio greater than 1.

10. The light management film construction of claim 1, wherein the asymmetrical structures protrude 50 micrometers to 250 micrometers from the first major surface of the first optical film.

11. The light management film construction of claim 1 wherein the asymmetrical structures comprise a thermoplastic or a thermoset material.

12. The light management film construction of claim 1, wherein the second major surface of the second optical film is bonded to the microstructured surface of the first optical film by an adhesive layer present on the second major surface of the second optical film.

13. The light management film construction of claim 1 wherein second major surface of the first optical film comprises a coating, wherein the coating comprises an adhesive coating.

14. The light management film construction of claim 1, wherein at least one of the first optical film or the second optical film comprises a multilayer film comprising alternating polymeric layers that cooperate to reflect infrared radiation.

15. A method for preparing a light management film construction comprising:
    preparing a first optical film comprising a first major surface and a second major surface opposite the first major surface wherein the first major surface comprises a microstructured surface comprising asymmetrical structures;
    providing a second optical film comprising a first major surface and a second major surface opposite the first major surface;
    contacting the second major surface of the second optical film to the microstructured surface of the first optical film; and
    bonding the second major surface of the second optical film to substantially all of the structures of the first major structured surface of the first optical film.

16. The method of claim 15, wherein the second major surface of the second optical film comprises an adhesive layer and bonding comprises adhesive bonding.

17. The method of claim 15, wherein preparing the first optical film comprises a cast and cure process to form the microstructured first major surface.

18. An article comprising:
    a substrate; and
    a light management film attached to the substrate, the light management film comprising:
        a first optical film having a first major surface and a second major surface opposite the first major surface wherein the first major surface comprises a microstructured surface comprising asymmetrical structures; and
        a second optical film having a first major surface and a second major surface opposite the first major surface, the second major surface disposed adjacent to and making contact with and bonded to substantially all of the structures of the first major structured surface of the first optical film, and wherein the first major surface of the first optical film and second major surface of the second optical film defines an enclosed volume partially occupied by the structures on the first major surface of the first optical film such that the structures occupy 20-80% of the total volume defined.

19. The article of claim 18, wherein the asymmetrical structures on the light management film comprise an ordered arrangement of a plurality of multi-sided refractive prisms, wherein a cross section of each of the multi-sided refractive prisms comprise 4 sides A B, C, and D such that: side A of the multi-sided refractive prism is parallel to and adjacent to the first major surface of the first optical film; side B of the multi-sided refractive prism is joined to side A and is designed to produce total internal reflection of light rays incident upon the second major surface of the first optical film at an angle of from 15-80° above the horizontal of normal to side A; side C of the multi-sided refractive prism is joined to side A; and side D of the multi-sided refractive prism is connected to side C and side B, and is designed to substantially redirect light rays reflected from side B in a direction away from side B and towards the side C or D.

20. The method of redirecting light comprising:
providing a window;
providing a light management film construction comprising:
  a first optical film having a first major surface and a second major surface opposite the first major surface wherein the first major surface comprises a microstructured surface comprising asymmetrical structures; and
  a second optical film having a first major surface and a second major surface opposite the first major surface, the second major surface disposed adjacent to and making contact with and bonded to substantially all of the structures of the first major structured surface of the first optical film, and wherein the first major surface of the first optical film and second major surface of the second optical film defines an enclosed volume partially occupied by the structures on the first major surface of the first optical film such that the structures occupy 20-80% of the total volume defined; and
attaching the light management film construction to an inside surface or outside surface of the window.

* * * * *